United States Patent [19]

Pessimisis

[11] 4,107,087

[45] Aug. 15, 1978

[54] USE OF CITRIC ACID TO MAKE CATALYST FROM CATALYST FINES

[75] Inventor: George N. Pessimisis, Berwyn, Ill.

[73] Assignee: Nalco Chemical Company, Oak Brook, Ill.

[21] Appl. No.: 817,479

[22] Filed: Jul. 21, 1977

Related U.S. Application Data

[63] Continuation of Ser. No. 672,379, Mar. 31, 1976, abandoned.

[51] Int. Cl.$^2$ ............... B01J 29/06; B01J 27/00; B01J 27/02
[52] U.S. Cl. ............... 252/455 R; 252/434; 252/439
[58] Field of Search ............... 252/434, 455 R, 463, 252/439

[56] References Cited

U.S. PATENT DOCUMENTS

| | | | |
|---|---|---|---|
| 3,661,805 | 5/1972 | Horvath | 252/463 X |
| 3,773,693 | 11/1973 | Calcagno et al. | 252/463 X |
| 3,840,477 | 10/1974 | Braithwaite et al. | 252/455 R |

*Primary Examiner*—Carl F. Dees
*Attorney, Agent, or Firm*—John G. Premo; Robert A. Miller; Barry W. Sufrin

[57] ABSTRACT

The addition of citric acid to large amounts of catalyst fines allows their incorporation into catalyst formulations without the loss of important physical properties.

18 Claims, No Drawings

USE OF CITRIC ACID TO MAKE CATALYST FROM CATALYST FINES

This is a continuation of application Ser. No. 672,379 filed on Mar. 31, 1976 and now abandoned.

INTRODUCTION

In the production of hydrotreating catalyst or other alumina-supported catalysts, it is often desirable to have a process to extrude the catalyst or alumina support after it has been treated at intermediate or high temperatures, i.e., partially or fully calcined.

For example, in processes for producing virgin hydrodesulfurization catalysts, boehmitic or amorphous alumina or boehmitic or amorphous alumina impregnated with active metal precursors are extruded, dried at an intermediate temperature, and finally calcined at high temperature. During the drying and calcining steps, shrinkage of the extrudate and mechanical handling causes breakage and abrasion of the extrudate to give "fines", which consist of pieces and powder. These fines must be screened out before the catalyst can be used. To make the overall process economical, it is desirable to reincorporate these fines back into the catalyst by either adding them to virgin catalyst before extrusion or to reextrude the fines by themselves.

Previously, if over about 15% of the catalyst was made up of fines reincorporated by grinding and mixing with virgin material, the pills would have poor crush strength and attrition resistance. Extrusion of ground fines by themselves gave very poor catalysts. Furthermore, the pore volume above 200Å diameter for catalyst containing large amounts of fines would be considerably higher than in catalysts or supports without fines.

Another example where it is desirable to extrude calcined bodies which contain alumina is in the recovery and use of regenerated or spent catalyst. For these materials, it would be desirable to grind the catalyst pieces and extract the poisons and/or active metals. Then the ground material could be reimpregnated and extruded to give a rejuvenated catalyst.

Furthermore, the process of this patent may be applied to the extrusion of alumina-containing bodies that have been deliberately calcined before extrusion in order to give certain desirable properties.

OBJECTS

It is an object of this invention to provide a method of incorporating large amounts of dried or calcined alumina-containing bodies into catalyst formulations to give products of good strength. It is further an object of this invention to provide a method of extrusion of calcined alumina-containing bodies to give products of good strength. It is still further an object of this invention to provide a method to make denser extrudates from calcined alumina-containing bodies and to provide a method to decrease the pore volume above 200Å diameter in extruded bodies made wholly or partly from calcined alumina-containing bodies. Further objects will be apparent herein.

THE INVENTION

This invention comprises a method of preparing hydrotreating catalysts from hydrotreating catalyst fines. To an aqueous slurry of the hydrotreating catalyst fines is added citric acid in a range of from 1.0 to 15.0% by weight. Above 15%, the citric acid would form too dense a product. Preferably, the citric acid ranges from 3.0 to 8.0% by weight, or even more, preferably from 4.0 to 5.0% by by weight, based on the weight of the fines. The slurry and citric acid is then mixed and the usual process for preparing hydrotreating catalysts is followed. Mixing, filtering, drying, extruding and calcining are used to form a hydrotreating catalyst. The hydrotreating catalyst fines are fines from a silica/alumina impregnated catalyst. These catalysts will be more fully described later.

The slurry ranges from 30 to 70% by weight of hydrotreating catalyst fines. Additionally, the slurry may contain silica/alumina impregnated gel. This is the standard silica/alumina impregnated gel used as one of the original ingredients in the preparation of the hydrotreating catalyst. This invention encompasses using 100% hydrotreating catalyst fines or using a mixture of catalyst fines and silica/alumina impregnated gel. In using a mixture of fines and silica/alumina impregnated gel, the gel can range up to 90.0%. The gel can even be higher, but the invention comprises a method of using hydrotreating catalyst fines, and therefore the slurry should contain at least 5% fines and, preferably, 50.0% by weight, and may even contain 100% fines and no silica/alumina gel. The solids, whether fines and/or gel, in the slurry range from 10 to 50% by weight and the water from 50 to 90% by weight.

The basic method for preparing the hydrotreating catalyst used in the present invention comprises catalyzing a silica/alumina gel which is impregnated with:

A. a metal selected from the group consisting of iron, cobalt, nickel, palladium, and platinum; and B. a metal selected from the group consisting of chromium, molybdenum, tungsten, selenium, and tellurium.

The silica/alumina gel typically will contain from 60 to 90% by weight of water, preferably 70 to 85% by weight. The gel generally contains 2 to 10% by weight of silica and 90 to 98% by weight of alumina, based on the total weight of solids. The preferred composition has 2 to 5% by weight of silica and 95 to 98% by weight of alumina. The silica/alumina gel is impregnated with 2 to 5% by weight of a metal selected from the group consisting of iron, cobalt, nickel, palladium and platinum; and from 10 to 15% by weight of a metal selected from the group consisting of chromium, molybdenum, tungsten, selenium, and tellurium. The preferred metals are cobalt and molybdenum.

The silica/alumina gel is prepared by any of the well known methods. To the silica/alumina gel is added an aqueous solution or suspension of salts of a metal from each of the groups listed above. Preferred soluble salts include nitrates, halides, sulfates, acetates, and the like. Preferred insoluble salts include carbonates and hydrates. In the case of molybdenum, molydbenum trioxide may be used.

The concentration of the solution or suspension of the metal salts may vary depending upon the other reaction conditions such as temperature, soaking time, calcination conditions, etc.; so as to produce a catalyst having the composition described above. However, the solution will generally contain from 5 to 15% by weight of a metal salt from group (A) above and from 5 to 20% by weight of a metal salt from group (B) above.

After the aqueous solution or suspension of metal salts is added to the silica/alumina gel, the mixture is heated at about 170° to 180° F. for about 2 to 3 hours. This mixture is then filtered, dried, and the moisture is adjusted to the proper degree for extrusion. Typically, this level is from 50 to 70% by weight. After the material is extruded, it is then calcined at 1000° to 1500° F.

To more fully understand the nature of this invention, following are some examples.

EXAMPLE 1

Catalyst fines and pieces consisting of alumina impregnated with cobalt and molybdenum which have been calcined at between 1000°–1200° F. were further reduced in size by grinding. The material was dried at 150° F. and rewetted in a Simpson Muller to the moisture for best extrusion. This moisture, as determined on an Ohaus moisture analyzer by heating for 20 minutes at a setting of 75, was 47.5%. The material was extruded through a 5/64 inch die. The wet extrudate was dried at 300° F. for 2 hours and calcined for 3 hours at 1150° F. The side crush strength of the calcined extrudate was 11.3 pounds when determined on pills of length to diameter ratio of 2.5. The pills were sieved over a 20 mesh screen. An attrition test was run by tumbling 100 grams of the pills for one hours in a standard attrition apparatus. After the tumbling, the pills were sifted over a 20 mesh screen. The amount going through the screen when expressed as a percentage of the total used in the test is the attrition index. This sample had an index of 6.8%. The apparent bulk density was 0.65 gm/ml.

EXAMPLE 2

Fines and pieces similar to those of Example 1 were ground and adjusted to extrusion moisture in the Simpson Muller. Here the water used in adjusting the moisture contained citric acid equivalent to 9 percent by weight of the fines to be extruded.

After extrusion through a 5/64 inch die, the material was dried at 300° F. for 2 hours and calcined for 2 hours at 1100° F. The extrudate had a crush strength of 21.3 pounds and an attrition index of 1.0%. The superiority of a process using citric acid is demonstrated by these crush and attrition numbers. The apparent bulk density is 0.79 gm/ml. The increase in ABD when citric acid is used is a feature of this patent.

EXAMPLE 3

Catalyst fines similar to those in Example 1 except that the fines had been only partially calcined, i.e., between about 200°–500° F., were ground. The ground material was placed in a Simpson Muller and the moisture was adjusted to 41%. After extrusion through a 5/64 inch die, the material was dried at 300° F. for 2 hours and calcined at 1100° F. for 3 hours. The crushing strength was 16.8 pounds and the attrition index 1.5%. The apparent bulk density was 0.695 gm/ml. The pore volume in pores with diameters larger than 200Å was 0.196 ml/gm as measured by mercury porosimetry.

EXAMPLE 4

Another sample of the fines used in Example 2 (11.2 pounds as is, or 10 pounds dry basis) was slurried in 2 gallons of water at 118° F. which contained one pound of anhydrous citric acid. The slurry was filtered and the cake dried at 150° F. for 2 hours to a moisture of 31%. The material was then adjusted with water to a moisture of 39% in the Simpson Muller. After extrusion through a 5/64 inch die, the material was dried at 300° F. for 3 hours and calcined for 3 hours at 1100° F. The crush strength was 21.5 pounds and the attrition index was 2.0%. The apparent bulk density was 0.83 gm/ml and the pore volume in pores larger than 200Å was .0129 ml/gm. Here again, the bulk density increases substantially when citric acid is used. Also, the fact is demonstrated here that citric acid can be used to control the pore distribution of the pills above 200Å. The pore volume above 200Å diameter decreases when citric acid is used.

EXAMPLE 5

This example, when compared with Examples 6 and 7, demonstrates the utility of citric acid in aiding in the incorporation of large amounts of calcined fines in the final extrudate. The final extrudate will be made up of a virgin part and a calcined fines part. The calcined fines in general have the same composition as would the virgin catalyst if it were made without fines. Indeed, the fines may be pieces of virgin catalyst made at a different time.

First, a slurry of the virgin catalyst was made by impregnating 8300 pbw (parts by weight) on a calcined basis of a slurry of pseudo-boehmitic alumina with 1350 pbw of molybdenum trioxide. The slurry was heated at 180° F. for 1 hour. Then, 603 pbw of cobalt carbonate was added to the slurry and heated for an additional hour. Then 120 pbw of the above virgin slurry on a calcined basis and a slurry containing 70 pbw on a calcined basis of ground calcined fines were mixed.

The mixed slurry was filtered, partially dried and extruded. After further low temperature drying and finally calcination at 1050° F., the extrudate had a crush strength of 17.5 pounds, an apparent bulk density of 0.62 gm/ml and an attrition index of 1.8.

The pore volume above 200Å when measured by mercury porosimetry was .097 mls/gm.

The final product contained 36.8% fines and 63.2% virgin material.

EXAMPLE 6

A slurry was prepared as in Example 5 that contained 40 pbw of virgin material and 60 pbw of ground calcined fines. Ten pbw of this slurry on a calcined basis was mixed with one part by weight of anhydrous citric acid. After processing as in Example 5, the extrudate and a crush strength of 26.1 pounds, an apparent bulk density of 0.80 gm/ml, and an attrition index of 2.5. The pore volume of pores above 200Å diameter was 0.0138 ml/gm. The final product contained 60% fines and 40% virgin material.

EXAMPLE 7

A slurry was prepared as in Example 6 that contained 40 pbw of virgin material and 60 pbw of calcined fines. Twenty pbw of the above slurry on a calcined basis was mixed with 1 pbw of anhydrous citric acid. After processing as in Example 5, the extrudate had a crush strength of 17.5 pounds, an apparent bulk density of 0.76 gm/ml and an attrition index of 3.0. The pore volume of pores above 200Å diameter was 0.0137 ml/gm.

EXAMPLE 8

Boehmitic alumina gel containing 7.09 lbs. of alumina on a dry basis was impregnated with 2048 mls. of a solution containing the equivalent of 252 gm $MoO_3$/l, 58 gm CoO/l and 58 gm $P_2O_5$/l. The resulting slurry was spraydried to a powder. The spraydried material was calcined at 1100° F. 7.44 lbs. of the calcined powder was slurried in water at 15% solids and wet ground in a Sweco grinder. After grinding, 300 gm of anhydrous citric acid was added and mixed. The slurry was filtered. After filtering, the cake was dried at 125° F. It was rewetted with water in a Simpson muller to a moisture of 51%. The crumbly mass was extruded through a 5/64 inch die and then dried for three hours at 300° F. This was followed by calcination at 1100° F.

The crush strength was 14.9 pounds and the attrition index was 3.5.

Having thus described my invention, it is claimed:

1. A method of preparing hydrotreating catalysts from silica/alumina catalyst fines which comprises:
   A. adding from 1.0 to 15.0% by weight of citric acid to an aqueous slurry of said silica/alumina catalyst fines, said fines being silica/alumina hydrotreating catalyst fines impregnated with:
      (1) a metal selected from the group consisting of iron, cobalt, nickel, palladium and platinum; and
      (2) a metal selected from the group consisting of chromium, molybdenum, tungsten, selenium and tellurium;
   B. mixing, filtering, drying, extruding and calcining to form a hydrotreating catalyst.

2. The method of claim 1 wherein the citric acid ranges from 3.0 to 8.0% by weight.

3. The method of claim 1 wherein the citric acid ranges from 4.0 to 5.0% by weight.

4. The method of claim 1 wherein the alumina hydrotreating catalyst fines contain from 2.0 to 10% by weight silica.

5. The method of claim 1 wherein the alumina hydrotreating catalyst fines contain from 2.0 to 5.0% by weight silica.

6. The method of claim 1 wherein the alumina hydrotreating catalyst fines are impregnated with cobalt and molybdenum.

7. The method of claim 6 wherein the cobalt ranges from 2.0 to 5.0% by weight and the molybdenum ranges from 10 to 15% by weight.

8. A method of preparing hydrotreating catalysts which comprises:
   A. adding from 1.0 to 15.0% by weight of citric acid to an aqueous slurry containing a mixture of silica/alumina catalyst fines and silica/alumina gel, said fines and gel having been impregnated with:
      (1) a metal selected from the group consisting of iron, cobalt, nickel, palladium and platinum; and
      (2) a metal selected from the group consisting of chromium, molybdenum, tungsten, selenium and tellurium;
   B. mixing, filtering, drying, extruding and calcining said mixture to form a hydrotreating catalyst.

9. The method of claim 8 wherein the citric acid ranges from 3.0 to 8.0% by weight.

10. The method of claim 8 wherein the citric acid ranges from 4.0 to 5.0% by weight.

11. The method of claim 8 wherein the aqueous slurry contains from 10 to 100% by weight silica/alumina catalyst fines and from 0 to 90% by weight silica/alumina impregnated gel.

12. The method of claim 8 wherein the silica/alumina catalyst fines ranges from 30 to 95% by weight and the silica/alumina impregnated gel ranges from 5 to 70% by weight.

13. The method of claim 8 wherein the silica/alumina catalyst fines range from 40 to 70% by weight and the silica/alumina impregnated gel ranges from 30 to 60% by weight.

14. The method of claim 8 wherein the silica/alumina hydrotreating fines and the silica/alumina impregnated gel ranges from 2.0 to 10% silica and from 90 to 98% alumina by weight.

15. The method of claim 8 wherein the silica/alumina hydrotreating fines and the silica/alumina impregnated gel ranges from 2.0 to 5.0% by weight silica and from 95 to 98% by weight alumina.

16. The method of claim 8 wherein the fines and gel have been impregnated with from 2.0 to 5.0% of a metal selected from the group consisting of iron, cobalt, nickel, palladium, and platinum; and from 10.0 to 15.0% by weight of a metal selected from the group consisting of chromium, molybdenum, tungsten, selenium and tellurium.

17. The method of claim 8 wherein the silica/alumina hydrotreating catalyst fines and the silica/alumina impregnated gel are impregnated with cobalt and molybdenum.

18. The method of claim 8 wherein the silica/alumina hydrotreating catalyst fines and the silica/alumina impregnated gel are impregnated with from 2.0 to 5.0% by weight of cobalt and from 10.0 to 15.0% by weight of molybdenum.

* * * * *